Patented Oct. 22, 1946

2,409,828

UNITED STATES PATENT OFFICE 2,409,828

AMINOMETHYL AMIDOTHIAZOLES

Louis H. Bock, Huntingdon Valley, Pa., Howard C. E. Johnson, New York, N. Y., and Leonard J. Armstrong, Philadelphia, Pa., assignors to Rohm & Haas Company, Philadelphia, Pa.

No Drawing. Application May 14, 1945, Serial No. 593,777

16 Claims. (Cl. 260—302)

This invention relates to aminomethyl amidothiazoles and to a method for their preparation. More particularly, it relates to non-aromatic aminomethyl carboxylic amidothiazoles and quaternary ammonium salts from the tertiary amines thereof.

These amidothiazoles are prepared by reacting by condensing together an amidothiazole, formaldehyde, and a non-aromatic, strongly basic amine carrying a reactive hydrogen atom on the amino nitrogen atom thereof.

The formaldehyde may be used in the form of the aqueous solutions of commerce or in a solution in an organic solvent. It may likewise be used in the form of a polymer yielding formaldehyde, such as paraformaldehyde, or other material yielding formaldehyde in the reaction. Paraformaldehyde is a particularly convenient reagent, since it may be used in a solvent system which under reflux permits separation of water of condensation about as rapidly as it is formed.

For the reactive amine there is a wide choice available of amines which have one or two reactive hydrogen atoms on the amino nitrogen atom and which are non-aromatic, by which expression there is designated herein those amines in which the amino nitrogen is not directly attached to an aryl ring, as it is in aniline. Strongly basic, non-aromatic primary and secondary amines may be used, such as monomethylamine, dimethylamine, ethylamine, diethylamine, dipropylamine, butylamine, dibutylamine, butylmethylamine, octylamine, octylmethylamine, allylamine, diallylamine, dodecylmethylamine, benzylamine, methylbenzylamine, cyclohexylamine, morpholine, piperidine, piperazine, pyrrolidine, ethylenediamine, propylenediamine, diethylenetriamine, and the like. If desired, the amines may be used in the form of their reaction products with formaldehyde, as represented by tetramethylmethylenediamine.

Among the amines there are some preferred subclasses. Those amines which do not contain over eight carbon atoms in any substituent are particularly desirable in view of their reactivity. Again the secondary amines as a class are highly useful inasmuch as they give fairly well-defined products and these products, which are tertiary amines, are readily convertible to quaternary ammonium salts by reaction with an agent for "alkylation" such as benzyl chloride, methallyl chloride, ethyl iodide, ethyl sulfate, or the like. Another class of amines which give valuable products comprises the cyclic amines which contain a divalent chain which, in conjunction with the amino nitrogen, forms a heterocycle. The tertiary amines formed therefrom also yield quaternary ammonium compounds. Quaternary ammonium salts may also be formed from the condensates of primary amines with proportions of other components yielding tertiary amines.

In the case of primary amines, one to two mols of formaldehyde may be reacted per mol of said amine and from one to two mols of amidothiazole per mol of amine, there being at least three possible products which result. One mol of secondary amine reacts with one mol of formaldehyde and one mol of amidothiazole. When a product such as tetramethylmethylenediamine is used, the additional formaldehyde needed may be supplied by paraformaldehyde or a formaldehyde solution. While a proportion of about one mol of formaldehyde per mol of amidothiazole in the reaction mixture gives a reacting ratio of these two reactants, excess of any of the reactants may be employed and the unreacted materials subsequently removed.

The amidothiazoles employed are primarily the carboxylic amides of a carboxylic acid and a 2-aminothiazole. While 2-aminothiazole itself,

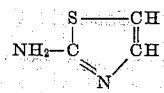

may be used as the basis of the production of the carboxylic amides, there may also be used 2-amino-4-hydrocarbon-substituted thiazoles of the formula

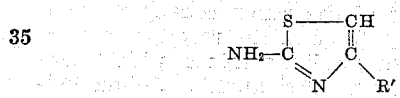

wherein R' represents an alkyl group such as methyl, tert.-butyl, α, α, γ, γ-tetramethylbutyl, or the like, or an aryl group such as phenyl, methylphenyl, tert.-butylphenyl, octylphenyl, etc. Such aminothiazoles may be converted by conventional procedures to the amides,

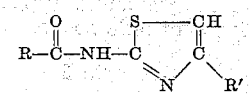

wherein R represents the residue of a carboxylic acid, such as the methyl group, or an ethyl, propyl, butyl or heptyl group from carboxylic acids such as propionic, butyric, valeric or caprylic, or isomers thereof, or residues from such acids as lauric, myristic, palmitic, stearic, undecenoic, oleic, tetrahydrobenzoic, hydrocinnamic, benzoic, furoic, or other carboxylic acid. The essential feature of the thiazoles used is the presence of a hydrogen atom on the carbon atom which is in the beta position in respect to the ring nitrogen atom. For this reason, the amido hydrogen atoms may both be replaced without influencing the condensation with formaldehyde and reactive amines.

The three reactants, amidothiazole, formaldehyde, and amine, may be mixed in any order. In some cases, the reaction starts at room temperature. It is accelerated by heating, and temperatures from about 25° to about 120° C., preferably 50° C. to about 110° C., are suitable for effecting the condensation. The reaction may be effected in the presence of an organic solvent, such as a hydrocarbon solvent, including benzene, toluene, or petroleum naphthas, or dioxane, methyl ethyl ketone, or other organic solvent.

The nature of the aminomethyl derivatives formed varies considerably, depending upon the amine used, the type of amide group, and the presence or absence of a hydrocarbon substituent in the thiazole ring. Some of the products are well defined; others appear resinous in character. The amines are insoluble in water but dissolve in acid solutions. The tertiary aminomethyl amidothiazoles form quaternary ammonium compounds which are water-soluble.

When one of the substituent hydrocarbon groups contains eight or more carbon atoms, the aqueous solutions formed from the aminomethyl amidothiazoles exhibit capillary activity and the compounds act as cation-active wetting agents, emulsifiers, and dispersing agents. The new compounds of this invention are useful as textile treating agents, toxicants for parasiticidal and fungicidal compositions, pharmaceutical agents, additives for petroleum products, fuels, and lubricants, acting as anti-oxidants, stabilizers, pour point depressors, film strengtheners, or anti-corrosives.

The invention is further illustrated by the following examples in which parts are by weight.

*Example 1*

A mixture of seventeen parts of 2-stearamidothiazole, one part of paraformaldehyde, and five parts of tetramethylmethylenediamine in one hundred parts of naphtha, boiling at 40°-60° C., was heated under reflux for four hours. Water of condensation was removed as formed by a trap at the foot of the reflux condenser. The solvent was stripped from the reaction mixture and a low-melting solid obtained which consisted primarily of 2-stearamido-5-dimethylaminomethyl thiazole.

Fourteen and a half parts of this amine was heated at 70° C. for two hours with five parts of benzyl chloride. The resulting product was a white solid which was soluble in water. Its solutions exhibited reduced surface tension, gave foam, and had the properties typical of solutions of cation-active synthetic soaps.

*Example 2*

A mixture of 835 parts of 2-stearamido-4-methyl thiazole, 284 parts of tetramethylmethylenediamine, and 75 parts of paraformaldehyde in 1150 parts of benzene was heated at reflux temperatures for five hours. The water of condensation was removed as it was formed in the reaction. The solvent was then removed under reduced pressure. The product thus obtained, a low-melting solid, was 2-stearamido-4-methyl-5-dimethylaminomethyl thiazole.

Ninety-seven parts of this amine and twenty-two parts of benzyl chloride were mixed and heated together for three hours at 60° C. There resulted a tan solid which corresponded in composition to

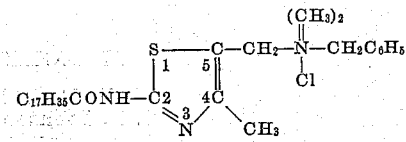

*Example 3*

A mixture of 102 parts of 2-acetamidothiazole, 50 parts of tetramethylmethylenediamine, and 10 parts of paraformaldehyde in 500 parts of benzene was stirred and heated under reflux for five hours. As water formed in the reaction, it was separated in a trap at the base of the reflux condenser. When approximately the theoretical amount of water had been collected, the reaction mixture was heated under reduced pressure and the solvent removed. The product remaining was primarily 2-acetamido-5-dimethylaminomethyl thiazole.

One hundred parts of this product heated with 51 parts of benzyl chloride for two hours at 65°-70° C. gave a material which could be recrystallized from benzene. The purified material corresponded in composition to

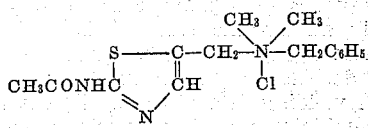

*Example 4*

A mixture of 275 parts of 2-benzamidothiazole, 100 parts of tetramethylmethylenediamine, and 20 parts of paraformaldehyde in 1,000 parts of benzene was heated for five hours under reflux. The water of condensation was separated from the refluxing liquid. Finally, the mixture was stripped of solvent under reduced pressure to yield a light yellow oil, which corresponded in composition to the compound, 2-benzamido-5-dimethylaminomethyl thiazole.

A mixture of 311 parts of the light yellow oil and 136 parts of benzyl chloride was heated for two hours at 60°-70° C. There resulted a compound which gave a clear solution and which behaved like that of typical quaternary ammonium salts. The crude product was recrystallizable from benzene to give a relatively pure quaternary ammonium chloride.

In place of the reaction product of dimethylamine and formaldehyde used above, there may be used equivalent amounts of dimethylamine and formaldehyde or of other secondary amine and formaldehyde, separately or as a preformed addition product.

*Example 5*

A chloromethyl thiazole was prepared by mixing and heating together sixty parts of 2-stearamidothiazole and five parts of paraformaldehyde in three hundred parts of benzene in the presence of a trace of dimethylamine, stripping off the solvent, and reacting with forty parts of thionyl chloride. After the latter mixture had been heated for two hours, excess thionyl chloride was removed under reduced pressure, leaving 2-stearamido-5-chloromethyl thiazole.

This product was converted to a quaternary ammonium salt by heating seventy-seven parts of the product with fifteen parts of pyridine for four hours at 50°–80° C. The resulting material was a light-colored solid which was readily soluble in water and which exhibited the typical behavior of cation-active synthetic soaps, reducing surface tension, giving foam, precipitating various anion-active soaps, etc.

The crude material was recrystallized from low-boiling naphtha. The purified product was free from acidity and corresponded in composition to the compound

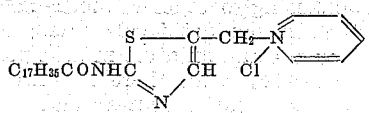

*Example 6*

A mixture of 179 parts of 2-stearamidothiazole, 22 parts of paraformaldehyde, and 62 parts of morpholine in 1,500 parts of benzene was heated under reflux for four hours. Water of condensation was trapped out from the refluxing liquid. The solvent was removed under reduced pressure, leaving as a residue a material which was chiefly 2-stearamido-5-morpholinomethyl thiazole. This could be dissolved with acids to give aqueous solutions of tertiary amine salts of the acids.

In place of the morpholine used above, there may be reacted in the same way any of the cyclic secondary amines, such as pyrrolidine, piperidine, or piperazine to give a tertiary amine in which the methyl amino group contains a heterocycle formed with a saturated divalent chain and the amino nitrogen.

A mixture of 23.5 parts of 2-stearamido-5-morpholinomethyl thiazole and 7.8 parts of benzyl chloride was heated at 70° C. for two hours. The product was a solid which dissolved in water and behaved as a typical quaternary ammonium compound.

*Example 7*

A mixture of 365 parts of 2-stearamidothiazole, 85 parts of aqueous formaldehyde (about 37%), 190 parts of a 25% aqueous dimethylamine solution, and 500 parts of toluene was vigorously stirred and heated at 80°–90° C. for eight hours. The phases were separated and the oil layer heated under reduced pressure to remove solvent. The resulting product was primarily 2-stearamido-5-dimethylaminomethyl thiazole.

A mixture of 92 parts of this product and 31 parts of methyl iodide was stirred and heated at 50°–55° C. for three hours. There resulted a low-melting solid which dissolved in water to give soaplike solutions. The solid was recrystallized from alcohol to give a somewhat purer quaternary ammonium compound which approached in composition the compound

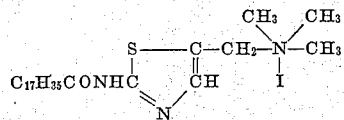

Quaternary ammonium salts may similarly be formed by replacing the methyl iodide with ethyl sulfate, allyl bromide, ethyl chloroacetate, or other agent for alkylating.

*Example 8*

A mixture of eighteen parts of 2-stearamido-4-phenylthiazole, one part of paraformaldehyde, and four parts of tetramethylmethylenediamine in one hundred parts of benzene was heated under reflux for four hours. Water was separated in a trap from the condensate from the refluxing liquid. The solvent was taken off under reduced pressure, yielding a solid which consisted principally of 2-stearamido-4-phenyl-5-dimethylaminomethyl thiazole. The compound dissolves in aqueous acids and reacts with agents for alkylation to give the corresponding quaternary ammonium compound.

*Example 9*

A mixture of 170 parts of 2-butyrylamidothiazole, 130 parts of 2-ethylhexylamine, and 65 parts of paraformaldehyde in 500 parts of toluene was heated under reflux until water no longer was evolved. The solvent was then removed under low pressure and the reaction product obtained as a condensate of the reactants. It is soluble in dilute acetic acid, forming solutions which foam and exhibit other capillary-active properties.

*Example 10*

A mixture of 142 parts of 2-lauroylamido-4-methylthiazole, 30 parts of paraformaldehyde, and 24 parts of amylamine in 500 parts of benzene was heated under reflux. The water of condensation was separated by means of a trap. The solvent was stripped from the reaction product under reduced pressure. The remaining solid contains chiefly bis(lauroylamidomethylthiazole methylene)-amylamine.

*Example 11*

Fifteen parts of 2-acetamidothiazole, sixteen parts of 37% aqueous formaldehyde, and thirty-six parts of 25% aqueous dimethylamine were heated together under reflux for six hours. The reaction mixture did not separate into layers on standing. It was stripped under reduced pressure on a steam bath to remove water and excess dimethylamine and formaldehyde. The product was a liquid. Titration of a sample for amine with standard acid gave an apparent molecular weight of 526, corresponding to 38% conversion to 5-dimethylaminomethyl-2-acetamidothiazole.

We claim:

1. A condensation product of a 2-carboxylic amidothiazole having a hydrogen atom on the carbon atom in beta position to the ring nitrogen atom and at least one mol each of formaldehyde and a strongly basic, non-aromatic amine having at least one reactive hydrogen atom on the amino nitrogen atom thereof.

2. A condensation product of a 2-carboxylic amidothiazole having a hydrogen atom on the carbon atom in beta position to the ring nitrogen atom and at least one mol each of formaldehyde and a strongly basic, non-aromatic primary amine.

3. A condensation product of a 2-carboxylic amidothiazole having a hydrogen atom on the carbon atom in beta position to the ring nitrogen atom and one mol each of formaldehyde and a strongly basic, non-aromatic secondary amine.

4. A condensation product of a 2-carboxylic amidothiazole having a hydrogen atom on the carbon atom in beta position to the ring nitrogen atom and one mol each of formaldehyde and a strongly basic, non-aromatic secondary amine having less than nine carbon atoms in each nitrogen substituent.

5. A condensation product of a 2-carboxylic amidothiazole having a hydrogen atom on the carbon atom in beta position to the ring nitrogen atom and at least one mol each of formaldehyde and dimethylamine.

6. A condensation product of a 2-acylamidothiazole, formaldehyde, and a strongly basic, non-aromatic amine having at least one reactive hydrogen atom on the amino nitrogen atom thereof and having less than nine carbon atoms in any substituent thereof.

7. A condensation product of a 2-acylamidothiazole, formaldehyde, and a strongly basic, non-aromatic secondary amine having less than nine carbon atoms in each nitrogen substituent.

8. A condensation product of 2-acylamido-4-methylthiazole, formaldehyde, and a strongly basic, non-aromatic secondary amine having less than nine carbon atoms in each nitrogen substituent.

9. A condensation product of 2-stearamidothiazole, formaldehyde, and a strongly basic, non-aromatic secondary amine having less than nine carbon atoms in each nitrogen substituent.

10. A condensation product of 2-stearamidothiazole, formaldehyde, and dimethylamine.

11. A process for preparing 2-carboxylic amido-5-aminomethyl thiazoles which comprises reacting by condensing together a 2-carboxylic amidothiazole having a hydrogen atom on the carbon atom in beta position to the ring nitrogen atom thereof and at least one mol each of formaldehyde and a strongly basic, non-aromatic amine having at least one reactive hydrogen atom on the amino nitrogen atom thereof.

12. A process for preparing 2-carboxylic amido-5-aminomethyl thiazoles which comprises reacting by condensing together in molecular proportions a 2-carboxyamidothiazole having a hydrogen atom on the carbon atom in beta position to the ring nitrogen atom thereof, formaldehyde, and a strongly basic, non-aromatic secondary amine.

13. A process for preparing 2-carboxylic amido-5-aminomethyl thiazoles which comprises reacting by condensing together in molecular proportions a 2-carboxyamidothiazole having a hydrogen atom on the carbon atom in beta position to the ring nitrogen atom thereof, formaldehyde, and a strongly basic, non-aromatic secondary amine having less than nine carbon atoms in each nitrogen substituent.

14. A process for preparing 2-carboxylic amido-5-aminomethyl thiazoles which comprises reacting by condensing together in molecular proportions a 2-carboxyamidothiazole having a hydrogen atom on the carbon atom in beta position to the ring nitrogen atom thereof, formaldehyde, and a strongly basic, non-aromatic primary amine having less than nine carbon atoms in the nitrogen substituent.

15. A process for preparing 2-carboxylic amido-5-aminomethyl thiazoles which comprises reacting by condensing together in molecular proportions a 2-carboxyamidothiazole having a hydrogen atom on the carbon atom in beta position to the ring nitrogen atom thereof, formaldehyde, and dimethylamine.

16. A process for preparing 2-carboxyamido-5-aminomethylthiazoles which comprises reacting by condensing together in molecular proportions a 2-carboxyl amidothiazole which contains a hydrocarbon substituent of at least eight carbon atoms in the amido group, formaldehyde, and a strongly basic, non-aromatic secondary amine having less than nine carbon atoms in each nitrogen substituent.

LOUIS H. BOCK.
HOWARD C. E. JOHNSON.
LEONARD J. ARMSTRONG.